United States Patent [19]

Igarashi et al.

[11] 3,911,338

[45] Oct. 7, 1975

[54] CURRENT CONTROL CIRCUIT FOR A PLURALITY OF LOADS

[75] Inventors: Yoshiaki Igarashi, Kadoma; Kazutsugu Kobayashi, Takatsuki; Hisayuki Matsumoto, Neyagawa, all of Japan

[73] Assignees: Matsushita Electric Industrial Co., Ltd., Kadoma; Wireless Research Lab, Osaka, both of Japan

[22] Filed: Nov. 13, 1972

[21] Appl. No.: 305,830

Related U.S. Application Data

[62] Division of Ser. No. 154,548, June 18, 1971.

[30] Foreign Application Priority Data

June 26, 1970 Japan.............................. 45-56342
June 26, 1970 Japan.............................. 45-56344

[52] U.S. Cl. ................. 318/138; 318/254; 318/432
[51] Int. Cl.² ......................................... H02P 7/06
[58] Field of Search .......... 318/432, 434, 430, 696, 318/685, 254; 310/49

[56] References Cited
UNITED STATES PATENTS

| | | | |
|---|---|---|---|
| 2,994,813 | 8/1961 | Towner et al. | 318/696 |
| 3,042,819 | 7/1962 | Kennedy | 318/696 |
| 3,117,268 | 1/1964 | Madsen | 310/49 |
| 3,199,009 | 8/1965 | Lien et al. | 318/696 |
| 3,301,269 | 1/1967 | Marwood | 318/696 |
| 3,355,646 | 11/1967 | Goto | 318/685 |
| 3,452,263 | 6/1969 | Newell | 318/696 |
| 3,467,902 | 9/1969 | Shimizu et al. | 318/696 |
| 3,577,176 | 5/1971 | Kreithen | 318/685 |
| 3,662,245 | 5/1972 | Newell | 318/696 |
| 3,732,472 | 5/1973 | Favre | 318/696 |

*Primary Examiner*—G. R. Simmons
*Attorney, Agent, or Firm*—Wenderoth, Lind & Ponack

[57] ABSTRACT

An electronic circuit for switching and controlling a current flowing through a plurality of loads so that it is proportional to a reference signal irrespective of an unbalance and a variation of the $h_{FE}$ values of current amplifying transistors wherein a current detector detects the total current flowing through the loads and the output of said detector is used as a feedback signal. When the circuit is used to control an electronically commutated motor, a motor generating a smooth and constant torque is easily obtained.

2 Claims, 6 Drawing Figures

CURRENT CONTROL CIRCUIT FOR A PLURALITY OF LOADS

This is a division of application Ser. No. 154,548 filed June 18, 1971.

This invention relates to an electronic circuit for controlling the load current flowing through a plurality of loads, and more particularly to an electronic circuit for switching and controlling the current for each load so that it is proportional to a reference signal.

In order to control the speed or the generating torque of a direct current motor, the armature current of the motor can be controlled. In a conventional direct current motor having brushes and commutators, the armature current is usually controlled by a transistor connected in series with the armature.

Recently, so-called brushless direct current motors or electronically commutated motors, which have neither mechanical brushes nor commutators, but which have contactless electronic commutators, have been designed and manufactured to produce highly reliable direct current motors. The armature current of such an electronically commutated motor can also be controlled by a series transistor. In this case, commutating transistors are operated as electronic commutators by being switched between the ON and OFF modes, and an additional power transistor is necessary as a series regulator.

Said commutating transistors can be used to control the magnitude of current in stator windings in the non-saturating mode. The armature current is controlled indirectly by controlling the base currents of said commutating transistors. The current flowing through each stator winding varies, depending upon the $h_{FE}$ (forward current transfer ratio) of each commutating transistor. therefore it is inevitable that the total current flowing through the stator windings has ripples in the wave forms thereof. An externally excited direct currentt motor generates a torque essentially proportional to the armature current. Therefore, an unbalance or a difference in the $h_{FE}$ of the commutating transistors causes a ripple in the generated torque.

In order to decrease this kind of torque ripple, transistors having an equal $h_{FE}$ value should be used for the commutating transistors. But equal $h_{FE}$ values are very difficult to achieve by practical manufacturing techniques. Even if said commutating transistors have equal $h_{FE}$ values, the $h_{FE}$ values also change depending upon the operating voltage applied to the transistors. The operating voltage varies according to the speed of the motor because the motor generates a counter electromotive force which is proportional to the motor speed. Consequently the generated torque varies in accordance with the change in the motor speed.

Therefore, it is an object of this invention to provide an electronic switching circuit for controlling the switched current for each load so that it is constant regardless of any unbalancing of the $h_{FE}$ of the current amplifying transistors.

It is a further object of this invention to provide an electronic circuit which is applicable to an electronically commutated motor for generating a smooth torque.

It is a still further object of this invention to provide an electronic circuit for controlling the electronically commutated motor for generating a constant torque regardless of the speed of the motor.

These objects are achieved by a controlling system for controlling the load current flowing through a plurality of loads comprising a plurality of current amplifying means, each supplying a load current to each of said plurality of loads; current detecting means for detecting the magnitude of the current flowing through said plurality of loads; reference signal means for generating a reference signal; comparator means which yield an output signal equal to the difference between the output of said current detecting means and said reference signal; amplifying means for amplifying said output signal of said comparator means; and a plurality of switching means for forming selectively a path for output of said amplifying means to said plurality of current amplifying means so as to operate the corresponding current amplifying means, whereby said plurality of load is selectively energized by a current proportional to said reference signal.

The scope of the invention will be readily apparent from the following description, taken with the accompanying drawings, wherein.

Figure 1:
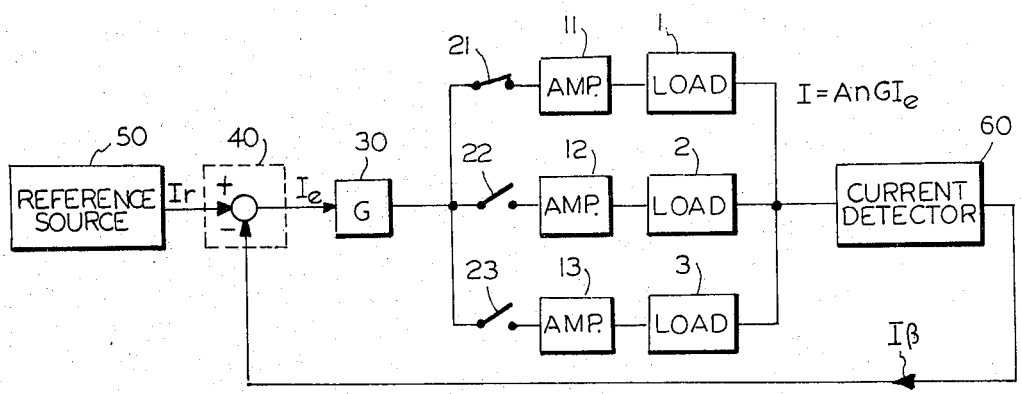
FIG. 1 is a block diagram of one embodiment of a system according to this invention.

Referring to FIG. 1, each of the current amplifiers 11, 12 and 13 supplies a load current to each of loads 1, 2 and 3, respectively. A current detector 60 detects the mangitude of current flowing through said loads 1, 2 and 3. A reference source 50 generates a reference signal. Comparator means 40 compares the output of said current detector 60 with said reference signal so as to provide an output signal equal to the difference between them. An amplifier 30 amplifies said output signal of said comparator means 40. The output of said amplifier 30 is supplied to said current amplifiers 11, 12 and 13 through switches 21, 22 and 23, respectively. Said switches 21, 22 and 23 are selectively operated so as to operate the corresponding current amplifiers 11, 12 and 13, respectively.

In operation, a reference source 50 supplies a D.C. reference current $I_r$. Usually one of the switches 21, 22 and 23 is closed to supply the current to one of the corresponding loads 1, 2 and 3. If it is assumed that the switch 21 is closed and switches 22 and 23 are opened, then the current amplifier 11 supplies the current I to the load 1. The current detector 60 detects the current I and provides an output $I\beta$, wherein $\beta$ is a constant. The comparator 40 compares the reference current $I_r$ with the output $I\beta$ of the current detector 60 and provides a difference current $I_e = (I_r - I\beta)$. Then this is amplified by the amplifier 30 for providing an output $GI_e$, wherein G designates the gain of the amplifier 30. This amplified signal $GI_e$ is supplied to the current amplifier 11 through the switch 21. The current amplifier 11 amplifies the input signal $GI_e$ to provide an output current $A_1GI_e$, which is equal to the current $I$ flowing through the load 1, wherein $A_1$ designates a gain of the amplifier 11.

Accordingly, the following equation is obtained:

$$I = A_1G(I_r - I\beta) \qquad (1)$$

From the equation (1) for $I$ there is obtained:

$$I = \frac{A_1G}{1+A_1G\beta} I_r \qquad (2)$$

When the switch 21 is opened and the switch 22 or 23 is closed, the load current I flowing through the load 2 or 3 is obtained similarly. Representing the gains $A_1$, $A_2$ and $A_3$ of the current amplifiers 11, 12 and 13 in a general form $A_n$ ($n=1,2$ and 3), the equation (2) can be written in general form, as follows:

$$I = \frac{A_nG}{1+A_nG\beta} I_r \qquad (3)$$

By choosing $A_nG\beta >> 1$, the load current $I$ becomes almost independent of the gains $A_n$ and can be represented by the following equation:

$$I = \frac{1}{\beta} I_r \qquad (4)$$

As described hereinbefore, each of the loads 1, 2 and 3 is selectively energized by a constant current determined by the reference signal $I_r$ in spite of the variation in the gains of the current amplifiers 11, 12 and 13. In other words, the variation of the gains of current amplifiers 11, 12 and 13 is compensated for according to this invention.

It should be noted that the reference signal generated by the reference source 50 is not limited to a D.C. current, but a D.C. voltage, an A.C. current or an A.C. voltage can also be used as the reference signal.

Figure 2:
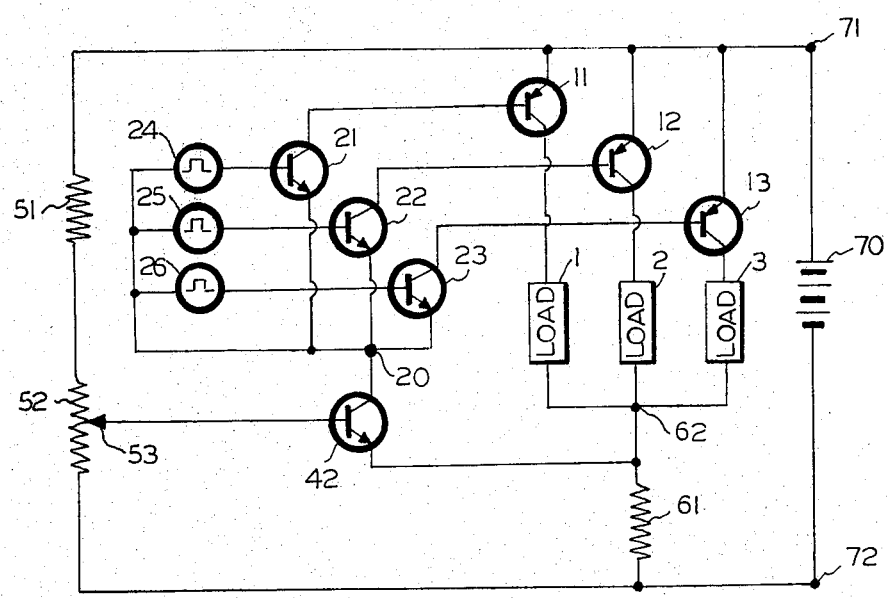
FIG. 2 is a circuit diagram of another embodiment of a system according to this invention.

Referring to FIG. 2, another embodiment of this invention is disclosed. Similar reference numbers represent similar components to those shown in FIG. 1. The collector of each current amplifying transistor 11, 12 and 13 is connected to a terminal of one of the loads 1, 2 and 3, respectively. The emitters of said current amplifying transistors 11, 12 and 13 are connected to a positive terminal 71 of a power source 70. The other terminals of each of the loads 1, 2 and 3 is connected to a junction terminal 62. A resistor 61 is connected between the junction terminal 62 and a negative terminal 72 of the power source 70. The bases of said current amplifying transistors 11, 12 and 13 are connected to the collectors of switching transistors 21, 22 and 23, respectively. The emitters of said switching transistors 21, 22 and 23 are connected to a junction point 20. Each of the switching control signal sources 24, 25 and 26 is connected across the base and emitter of switching transistors 21, 22 and 23, respectively, for controlling the operation thereof. The collector of a transistor 42 is connected to the junction point 20, the emitter of the transistor 42 is connected to the junction point 62.

A series connection of a resistor 51 and a variable resistor 52 is connected across the positive terminal 71 and the negative terminal 72 of the power source 70. An intermediate tap 53 of the variable resistor 52 is connected to the base of the transistor 42.

In operation, a reference voltage $E_r$ is provided across the intermediate tap 53 and the negative terminal 72 of the power source 70. By signals from switching control signal sources 24, 25 and 26, switching transistors 21, 22 and 23 operate in the ON-OFF mode. The collector current $I_c$ of the transistor 42 flows selectively through the emitter-collector path of one of the switching transistors 21, 22 and 23.

When the switching transistor 21 is switched ON by the signal from the switching control signal source 24 and other switching transistors 22 and 23 are OFF, the collector current $I_c$ of the transistor 42 is supplied to the base of the current amplifying transistor 11 through the collector-emitter path of the switching transistor 21. The collector current $I_1$ of the current amplifying transistor 11 is $I_c \cdot h_{FE1}$, wherein $h_{FE1}$ is the forward current transfer ratio of the transistor 11. This collector current $I_c \cdot h_{FE1}$ flowing through the load 1 and the emitter current $I_c$ of the transistor 42 flow through the resistor 61 and provide a voltage drop $(1+h_{FE1})I_cR$ across the resistor 61, where R is the resistance value of the resistor 61.

Generally, the characteristic voltage at the base-emitter junction of the transistor is substantially constant and almost independent of the collector current under normal operating conditions. In conventional silicon transistors, this voltage is about 0.65 volts. The voltage drop $(1+h_{FE1})I_cR$ across the resistor 61 is controlled so as to be $E_r - E_{be}$, where $E_{be}$ is the characteristic voltage at the base-emitter junction of the transistor 42. From the above, the following equations can be written:

$$E_r - E_{be} = (1+h_{FE1})I_cR \qquad (5)$$

$$I_1 = I_c h_{FE1} \qquad (6)$$

From equations (5) and (6), the following equation is obtained:

$$I_1 = \frac{E_r - E_{be}}{R} \cdot \frac{1}{1 + \frac{1}{h_{FE1}}} \qquad (7)$$

Because the usual relation is $h_{FE1} >> 1$, it is evident from the equation (7) that load current $I_1$ does not depend on $h_{FE1}$ of the current amplifying transistor 11, but depends on the resistance value R of the resistor 61, the reference voltage $E_r$ and the base-emitter characteristic voltage of the transistor 42.

When the switching transistor 21 is OFF and the switching transistor 22 or 23 is ON, the load current I is obtained in a similar way as described hereinbefore and the load current does not depend on $h_{FE}$ of the current amplifying transistor 12 or 13.

Even when two switching transistors, for example transistors 21 and 22, switch on at the same time, total current I flowing through the corresponding two loads, in this case loads 1 and 2, is as follows:

-Continued $$I = \frac{E_r - E_{be}}{R} \quad (8)$$

That is, the current flowing through the loads remains constant.

In order to change the load current, it is preferable to change the reference voltage $E_r$ by changing the setting of the variable resistor 52, or it is also preferable to change the resistance value R of the resistor 61.

Figure 3:
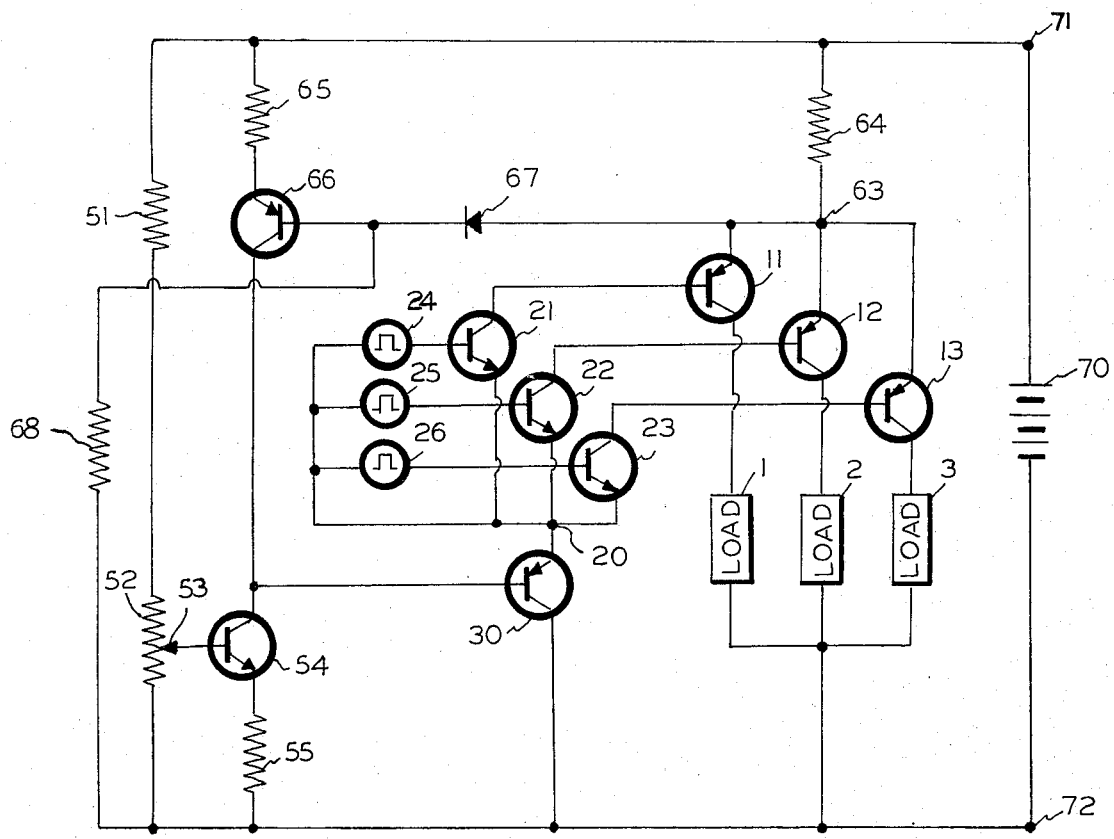
FIG. 3 is a circuit diagram of still another embodiment of a system according to this invention.

Referring to FIG. 3, still another embodiment of this invention is disclosed. Similar reference numbers represent similar components as shown in FIGS. 1 and 2.

The collectors of current amplifying transistors 11, 12 and 13 are connected to loads 1, 2 and 3, respectively. The emitters of said current amplifying transistors 11, 12 and 13 are connected commonly at a junction terminal 63. The resistor 64 is connected between the junction terminal 63 and the positive terminal 71 of the power source 70. The other terminals of the loads 1, 2 and 3 are connected commonly to the negative terminal 72 of the power source 70. Transistors 21, 22 and 23, switching control signal sources 24, 25 and 26, a resistor 51 and a variable resistor 52 are connected in a manner similar to that shown in FIG. 2. The base of a transistor 66 is connected to the junction terminal 63 through a forward biased diode 67. A resistor 68 is connected between the negative terminal 72 of the power source 70 and the junction point of the diode 67 and the base of transistor 66 so as to provide a bias current. The emitter of the transistor 66 is connected to the positive terminal 71 of the power source 70 through a resistor 65.

The emitter of an amplifying transistor 30 is connected to the junction point 20, and the collector of said transistor 30 is directly connected to the negative terminal 72 of the power source 70. The base of transistor 54 is connected to an intermediate terminal 53 of the variable resistor 52, and the emitter of the transistor 54 is connected to the negative terminal 72 of the power source 70 through a resistor 55. The collector of the transistor 54 is connected to the base of the transistor 30 and is also connected to the collector of the transistor 66.

The transistor 54, the resistor 55 and the variable resistor 52 constitute a reference source. The collector current $I_r$ of the transistor 54 is:

$$I_r = \frac{E_b - E_{be}}{R_r} \cdot \frac{h_{FEr} - 1}{h_{FEr}} \quad (9)$$

wherein $E_b$ is the voltage across the intermediate terminal 53 and the negative terminal 72 of the power source, $E_{be}$ the characteristic voltage at the base-emitter junction of the transistor 54, $R_r$ the resistance value of the resistor 55, and $h_{FEr}$ the forward current transfer ratio of the transistor 54. The collector current $I_r$ of the transistor 54 acts as a reference current which is equal to the sum of a base current $I_b$ of the transistor 30 and the collector current $I_{cd}$ of the transistor 66.

The transistor 30 amplifies the base current $I_b$ to provide an emitter current of magnitude $h_{FC}I_b$, where $h_{FC}$ is the forward current transfer ratio (common collector) of the transistor 30. The switching signal sources 24, 25 and 26 control the transistors 21, 22 and 23, respectively.

When one of the switching transistors 21, 22 and 23 is switched on by a signal from a corresponding one of the switching signal sources 24, 25 and 26, the emitter current of the transistor 30 flows through the emitter-collector path of the selected one of the transistors 24, 25 and 26 to the base of corresponding one of the transistors 11, 12 and 13. The collector currents $I_{Cn}$ and the emitter currents $I_{En}$ of the transistors 11, 12 and 13 are represented by the equations:

$$I_{Cn} = h_{FC} \cdot h_{FEn} \cdot I_b \quad (10)$$

$$I_{En} = (1 + h_{FEn}) \cdot h_{FC} \cdot I_b = \frac{1}{h_{hFEn}} \quad (11)$$

where $h_{FEn}$ ($n=1,2$ and 3) represents the forward current transfer ratios of the transistors 11, 12 and 13.

Each emitter current $I_{En}$ flows through the resistor 64 and produces a voltage drop $I_{En}R_a$ across the resistor 64, where $R_a$ is the resistance value of the resistor 64. the diode 67 is supplied with a bias current through the resistor 68 to give a forward diode voltage $V_D$ which is nearly equal to the base-emitter voltage of the transistor 66. This bias current is negligibly smaller than the emitter current of the transistor 11. Therefore, the emitter current $I_{Ed}$ and the collector current $I_{Cd}$ of the transistor 66 are represented as fofllows: follows:

$$I_{Ed} = \frac{I_{En}R_a + V_D - V_{BEd}}{R_b} \quad (12)$$

$$I_{Cd} = \frac{I_{Ed}}{1 + \frac{1}{h_{FEd}}} \quad (13)$$

where $V_{BEd}$ is the base-emitter voltage of the transistor 66, $R_b$ the resistance value of the resistor 65, and $h_{Fed}$ the forward current transfer ratio of the transistor 66. If $V_D$ and $V_{BEd}$ are equal to each other, $I_{Cd}$ becomes:

$$I_{Cd} \approx \frac{R_a}{R_b} I_c \quad (14)$$

The collector current $I_{Cd}$ of the transistor 66 is proportional to the load current, and $R_a/R_b$ corresponds to $\beta$ which appears in the illustration of FIG. 1. In case $h_{FC} \cdot h_{FEn} \cdot R_a/R_b \gg 1$, the current I flowing through each of the loads 1, 2 and 3 is:

$$I = \frac{R_b}{R_a} \cdot I_r \quad (15)$$

When $V_D$ and $V_{BE}$ are equal to each other as described above, the load current I becomes proportional to the reference current $I_r$.

If $V_D$ is greater than $V_{BE}$, the collector current of the transistor 66 cannot be zero, even when the load current is zero. Therefore, the reference current $I_r$ must include this current as bias, and the load current is proportional to an incremental portion of this bias.

If $V_D$ is smaller than $V_{BE}$, or when the base of the transistor 66 is directly connected to the junction point 63, the transistor 66 is cut off for a small load current and a feedback loop is not formed until the load current exceeds a threshold value at which the transistor 66 operates.

Figure 4:
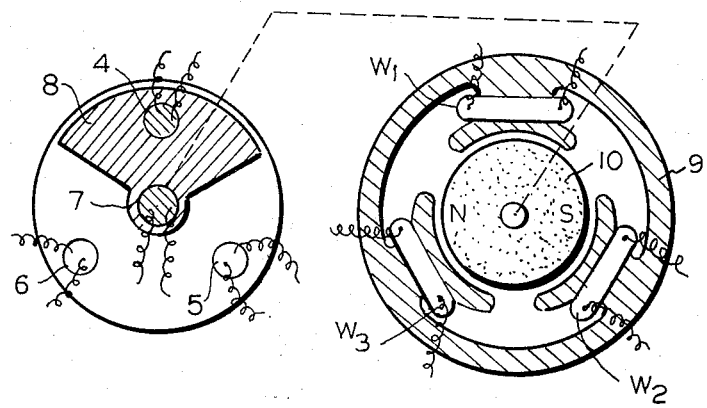
FIG. 4 is a schematic diagram of an electronically commutated motor showing a rotor-stator portion and a position detecting portion, for explanation of this invention.
Figure 5:
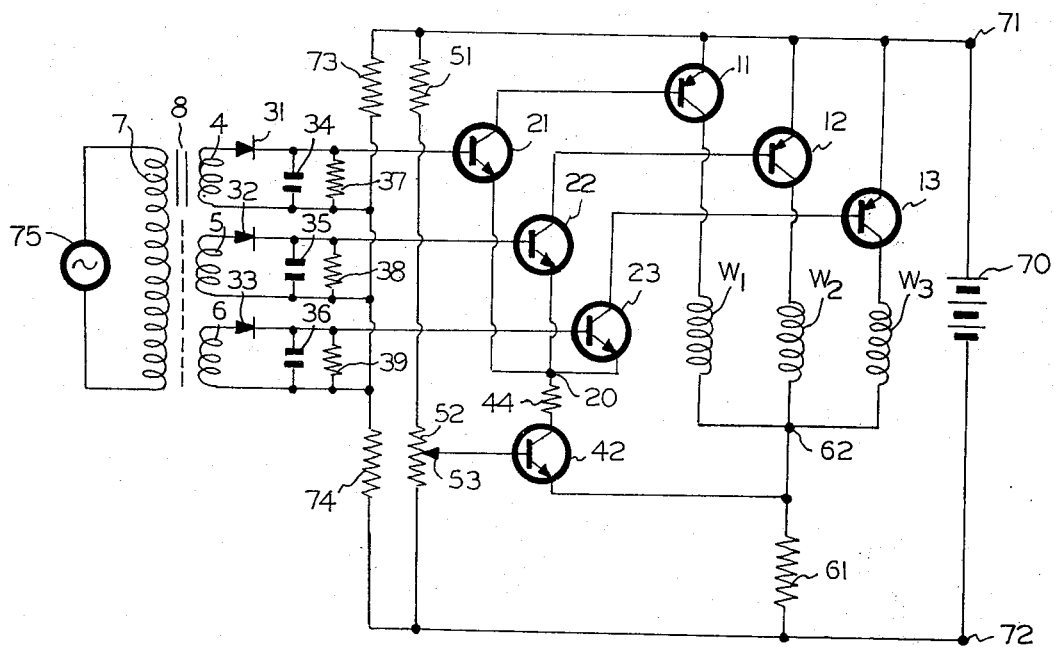
FIG. 5 is a circuit diagram of a further embodiment of a system according to this invention for controlling the electronically commutated motor of FIG. 4.

Referring to FIGS. 4 and 5, the manner in which this invention is used to control the current in armature windings of a brushless D.C. motor will be described.

FIG. 4 shows a schematic diagram of a brushless motor of the position detecting type. Stator windings $W_1$, $W_2$ and $W_3$ corresponding to loads 1, 2 and 3 in FIGS. 1, 2 and 3 are wound on stator 9. A rotor magnet 10 and a position detecting rotor 8 made of ferromagnetic material are mechanically coupled to each other. Said position detecting rotor 8 is arranged to couple magnetically a primary coil 7 with one of secondary coils 4, 5 and 6.

FIG. 5 shows an electronic circuit for controlling the motor in FIG. 4. The primary coil 7 is connected to an oscillator 75 which generates a relatively high frequency A.C. signal. The first ends of the secondary coils 4, 5 and 6 are connected together and are connected to a point at which a resistor 73 and a resistor 74 are connected to each other. The other terminals of resistors 73 and 74 are connected to the positive terminal 71 and the negative terminal 72 of a power source 70, respectively.

The other ends of secondary coils 4, 5 and 6 are connected to the bases of transistors 21, 22 and 23 through forward paths of diodes 31, 32 and 33, respectively.

Capacitors 34, 35 and 36 are connected between the bases of transistors 21, 22 and 23 and said first ends of said secondary coils 4, 5 and 6, respectively. Resistors 37, 38 and 39 are connected in parallel with said capacitors 34, 35 and 36, respectively. The collector of current amplifying transistors 11, 12 and 13 is connected to one end of each of stator windings $W_1$, $W_2$ and $W_3$, respectively. The emitters of said current amplifying transistors 11, 12 and 13 are connected together to the positive terminal 71 of the power source 70. The other terminals of stator windings $W_1$, $W_2$ and $W_3$ are connected together to a common point 62. A resistor 61 is connected between the common point 62 and the negative terminal 72 of the power source 70. The buses of said current amplifying transistors 11, 12 and 13 are connected to the collectors of switching transistors 21, 22 and 23 respectively. The emitters of said switching transistors 21, 22 and 23 are connected to a junction point 20. The collector of a transistor 42 is connected to the junction point 20 through a current limiting resistor 44. The emitter of the transistor 42 is connected to the common point 62. A series connection of a resistor 51 and a variable resistor 52 is connected across the positive terminal 71 and the negative terminal 72 of the power source 70. An intermediate tap 53 of the variable resistor 52 is connected to the base of the transistor 42.

The operation will be described in connection with FIGS. 4 and 5. The output signal of the oscillator 75 is fed to the primary coil 7. The position detecting rotor 8 magnetically couples the primary coil 7 with one of the secondary coils 4, 5 and 6. During the rotation of the position detecting rotor 8, there are obtained amplitude modulated A.C. signals at secondary coils 4, 5 and 6.

Diodes 31, 32 and 33 rectify said amplitude modulated A.C. signal at secondary coils 4, 5 and 6, and capacitors 34, 35 and 36 filter out the carrier frequency, i.e. the frequency generated by the oscillator 75. Output voltages from each of said diodes are supplied to the bases of transistors 21, 22 and 23, respectively.

When the position of the rotor 10 and the position detecting rotor 8 is in the relationship as shown in FIG. 4, an A.C. signal is induced at the secondary coil 4, and the switching transistor 21 conducts. Thus the current amplifying transistor 11 supplies a current to a stator winding $W_1$, to produce a rotation torque in cooperation with the rotor magnet 10.

Assume now the motor is arranged to rotate in the clockwise direction. After rotation through more than 60° from the position shown in FIG. 4, the position detecting rotor 8 couples the primary coil 7 with the secondary coil 5 and the coupling between the primary coil 7 and the secondary coil 4 is no longer effective. Thus the A.C. signal is induced at the secondary coil 5 and the A.C. signal at the secondary coil 4 decreases to a small value. The switching transistor 21 becomes non-conducting. The switching transistor 22 becomes conducting and the transistor 12 supplies a current to the stator winding $W_2$ so as to rotate the rotor 10 further in the clockwise direction.

In the same manner, after successive rotation through 120° by the rotor 10, an A.C. signal is induced at the secondary coil 6 and the switching transistor 23 conducts, and the transistor 13 supplies a current to stator winding $W_3$. In this manner, the rotor magnet 10 continues to rotate.

Thus the switching transistors 21, 22 and 23 are sequentially switched on, and the current amplifying transistors 11, 12 and 13 are controlled to supply currents to the stator windings $W_1$, $W_2$ and $W_3$, respectively. Because the circuit which comprises the current amplifying transistors 11, 12 and 13, the stator windings $W_1$, $W_2$ and $W_3$, the current detecting resistor 61, the transistor 42, and the transistors 21, 22 and 23 is arranged similarly to the circuit in FIG. 2, it is easily understood that the current flowing through the stator windings is controlled so as to be constant similarly to the case shown in FIG. 2.

During exchanging intervals, A.C. signals induced at the two secondary coils become equal to each other. Then two corresponding switching transistors become equally conductive and currents flow in two stator windings at the same time. But the total current is also controlled so as to be constant.

The variation in the $h_{FE}$ of the current amplifying transistors 11, 12 and 13 is compensated for by the circuit arrangement described and smooth torque having no ripple is available.

Even when the speed of the motor increases, the generating torque of the motor is maintained constant, because the current flowing through the stator windings is controlled so as to be constant.

Figure 6:
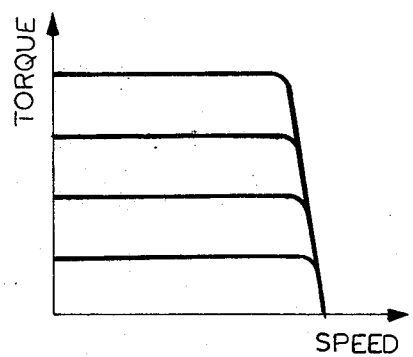
FIG. 6 is a chart showing the speed-torque characteristics of the motor in FIG. 4 controlled by the circuit in FIG. 5.

Therefore, the electronically commutated motor, such as shown in FIG. 4, driven by the circuit of FIG. 5, has a speed-torque characteristic as shown in FIG. 6.

As described in detail hereinbefore, all sorts of variations of the $h_{FE}$ and variation of the $h_{FE}$ depending on temperature can be compensated for according to the invention.

Although the description of the embodiments is directed to a circuit having three loads, it should be understood that this invention applies to any number of loads.

What is claimed is:

1. A direct current motor having a magnetic rotor and an electronic control circuit for controlling the load current flowing through a plurality of stator windings, comprising:

a plurality of current amplifying means to operate in a non-saturating mode and being coupled to respective stator windings, each supplying a load current to a corresponding one of said stator windings;

current detecting means coupled to the outputs of the stator windings for detecting a magnitude of a current;

reference signal means for generating a reference signal;

comparator means coupled to said current detecting means and said reference signal means for providing an output of said current detecting means and said reference signal;

amplifying means coupled to said comparator means for amplifying said output signal of said comparator means;

a plurality of switching means coupled between said amplifying means and the respective current amplifying means for selectively controlling the inputs to said current amplifying means, whereby said plurality of stator windings are selectively energized by a current, the instantaneous magnitude of which is proportional to said reference signal at a constant rate, regardless of the differences in the gains of said current amplifying means; and position detecting means producing a set of position signals to indicate the rotary position of said rotor relative to said stator windings, said position detecting means being coupled to said plurality of switching means so that one of said plurality of switching means is selectively switched on.

2. A direct current motor having a magnetic rotor and an electronic control circuit for controlling the load current flowing through a plurality of stator windings, comprising:

a plurality of current amplifying transistors for operation in a non-saturating mode and having a base, an emitter and a collector, the emitter-collector path of each said current amplifying transistors being connected to a respective one of said stator windings in a series connection, the plurality of said series connections being connected in parallel to each other;

a power source;

current detecting means connected between said power source and said parallel connected series connections and having an output terminal;

reference signal means generating a reference signal;

comparator means coupled to said current detecting means to said reference signal means for providing an output signal equal to the difference between the output of said current detecting means and said reference signal;

amplifying means coupled to said comparator means for amplifying said output signal of said comparator means;

a plurality of switching means coupled between said amplifying means and the bases of said current amplifying transistors for selectively controlling said bases of said plurality of current amplifying transistors, whereby said plurality of stator windings are selectively energized by a current, the instantaneous magnitude of which is proportional to said reference signal at a constant rate, regardless of the differences in the gains of said current amplifying transistors; and position detecting means producing a set of position signals to indicate the rotary position of said rotor relative to said stator windings, said position detecting means being coupled to said plurality of switching means so that one of said plurality of switching means is selectively switched on.

* * * * *